(12) United States Patent
Chen et al.

(10) Patent No.: US 11,431,674 B2
(45) Date of Patent: Aug. 30, 2022

(54) METHOD, DEVICE, AND PROGRAM PRODUCT FOR MANAGING ADDRESS OF DEVICE IN NETWORK

(71) Applicant: EMC IP Holding Company LLC, Hopkinton, MA (US)

(72) Inventors: Rui Chen, Chengdu (CN); Hua Wang, Chengdu (CN); Yuhan Zou, Sichuan (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/307,204

(22) Filed: May 4, 2021

(65) Prior Publication Data

US 2022/0182356 A1 Jun. 9, 2022

(30) Foreign Application Priority Data

Dec. 4, 2020 (CN) .......................... 202011412269.2

(51) Int. Cl.
| | |
|---|---|
| *G06F 15/16* | (2006.01) |
| *H04L 61/5046* | (2022.01) |
| *H04L 43/12* | (2022.01) |
| *H04L 61/5076* | (2022.01) |
| *H04L 101/622* | (2022.01) |

(52) U.S. Cl.
CPC .......... *H04L 61/5046* (2022.05); *H04L 43/12* (2013.01); *H04L 61/5076* (2022.05); *H04L 2101/622* (2022.05)

(58) Field of Classification Search
None
See application file for complete search history.

(56) References Cited

U.S. PATENT DOCUMENTS

| | | |
|---|---|---|
| 7,848,746 B2 | 12/2010 | Juels |
| 8,495,372 B2 | 7/2013 | Bailey et al. |
| 8,605,590 B2 | 12/2013 | Sivakumar et al. |
| 9,137,012 B2 | 9/2015 | Bailey et al. |
| 9,160,539 B1 | 10/2015 | Juels et al. |
| 9,516,059 B1 | 12/2016 | Dotan et al. |
| 9,774,517 B2 | 9/2017 | Wittenstein et al. |
| 9,923,718 B2 | 3/2018 | Bailey et al. |
| 10,958,632 B1 | 3/2021 | Bailey et al. |

(Continued)

FOREIGN PATENT DOCUMENTS

WO  WO-2011029406 A1 * 3/2011 ............. H04L 12/56

*Primary Examiner* — Phyllis A Book
(74) *Attorney, Agent, or Firm* — BainwoodHuang

(57) ABSTRACT

A technique that manages device addresses involves: sending, at a first device, a probe message to at least one other device, wherein the probe message includes a first MAC address of the first device, a first identifier of the first device, and an IP address to be assigned to the first device; receiving a message from a second device, the message including a second MAC address of the second device, a second identifier of the second device, and an IP address of the second device; and according to a determination that the IP address of the second device is the same as the IP address to be assigned to the first device, providing a probe alert including the identifies and indicating that an IP address conflict occurs. By writing device IDs in messages transmitted across a network, devices that may have an IP address conflict can be quickly detected.

20 Claims, 10 Drawing Sheets

(56) References Cited

U.S. PATENT DOCUMENTS

| | | | |
|---|---|---|---|
| 10,986,174 B1 | 4/2021 | Sharma et al. | |
| 2013/0311635 A1* | 11/2013 | Siegmund | H04L 61/103 709/223 |
| 2015/0095505 A1* | 4/2015 | Antony | H04L 61/5046 709/228 |
| 2015/0163100 A1* | 6/2015 | Graf | H04L 45/02 370/255 |
| 2015/0341853 A1* | 11/2015 | Cho | H04W 56/002 370/331 |
| 2017/0012935 A1* | 1/2017 | Raman | H04W 12/08 |
| 2021/0075759 A1* | 3/2021 | Mandal | H04L 61/2514 |

* cited by examiner

METHOD, DEVICE, AND PROGRAM PRODUCT FOR MANAGING ADDRESS OF DEVICE IN NETWORK

CROSS-REFERENCE TO RELATED APPLICATION

This application claims priority to Chinese Patent Application No. CN202011412269.2, on file at the China National Intellectual Property Administration (CNIPA), having a filing date of Dec. 4, 2020, and having "METHOD, DEVICE, AND COMPUTER PROGRAM PRODUCT FOR MANAGING ADDRESS OF DEVICE IN NETWORK" as a title, the contents and teachings of which are herein incorporated by reference in their entirety.

TECHNICAL FIELD

Implementations of the present disclosure relate to network management and, more particularly, to a method, a device, and a computer program product for managing addresses of devices in a network.

BACKGROUND

Network technologies have covered various aspects of people's work and life. A device can be connected to a network to access various resources in the network, while other devices in the network can access data in the device. IP (Internet Protocol) addresses can be assigned to the devices. However, address conflicts may occur during the process of assigning addresses. For example, two different devices may have the same IP address, which may cause an error of uncertain destination when accessing a device via an IP address. In this case, how to manage addresses of devices in a network in a more effective way has become a hot research topic.

SUMMARY OF THE INVENTION

Therefore, it is expected to develop and implement a technical solution to manage addresses of devices in a network in a more effective way. It is expected that this technical solution can be compatible with existing network management protocols, so as to manage the addresses of devices in a more convenient and effective manner.

According to a first aspect of the present disclosure, a method for managing addresses of devices in a network is provided, the network including a first device and at least one other device. In this method, at the first device, a probe message is sent to the at least one other device, wherein the probe message includes a first MAC (Media Access Control Address) address of the first device, a first identifier of the first device, and an IP address to be assigned to the first device. A message is received from a second device among the at least one other device, wherein the message includes a second MAC address of the second device, a second identifier of the second device, and an IP address of the second device. According to a determination that the IP address of the second device is the same as the IP address to be assigned to the first device, a probe alert is provided to indicate that an IP address conflict occurs between the first device and the second device, wherein the probe alert includes the first identifier and the second identifier.

According to a second aspect of the present disclosure, an electronic device is provided, including: at least one processor; a volatile memory; and a memory coupled to the at least one processor, the memory having instructions stored therein, wherein the instructions, when executed by the at least one processor, cause the device to execute the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

According to a fourth aspect of the present disclosure, a method for managing addresses of devices in a network is provided, the network including a first device and at least one other device. In this method, at a second device among the at least one other device, a message from the first device is received, wherein the message includes a first MAC address of the first device, a first identifier of the first device, and an IP address to be assigned to the first device. A type of the message is determined according to a determination that an IP address of the second device is the same as the IP address of the first device. According to a determination that the type of the message is a probe message, a message is sent to the first device, wherein the message includes a second MAC address of the second device, a second identifier of the second device, and an IP address of the second device.

According to a fifth aspect of the present disclosure, an electronic device is provided, including: at least one processor; a volatile memory; and a memory coupled to the at least one processor, the memory having instructions stored therein, wherein the instructions, when executed by the at least one processor, cause the device to execute the method according to the fourth aspect of the present disclosure.

According to a sixth aspect of the present disclosure, a computer program product is provided, which is tangibly stored on a non-transitory computer-readable medium and includes machine-executable instructions, wherein the machine-executable instructions are used to perform the method according to the fourth aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure can be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like, may refer to different or the same objects. Other explicit and implicit definitions may also be included below.

In an IP network, each network device may have its own IP address, and each network device may use its own IP address to access other network devices. However, two or more network devices may have the same IP address, which leads to IP address conflicts in network communication. At this moment, users and administrators of network devices are unaware that IP address conflicts have occurred in the network and don't know which network devices have the address conflicts.

Figure 1:
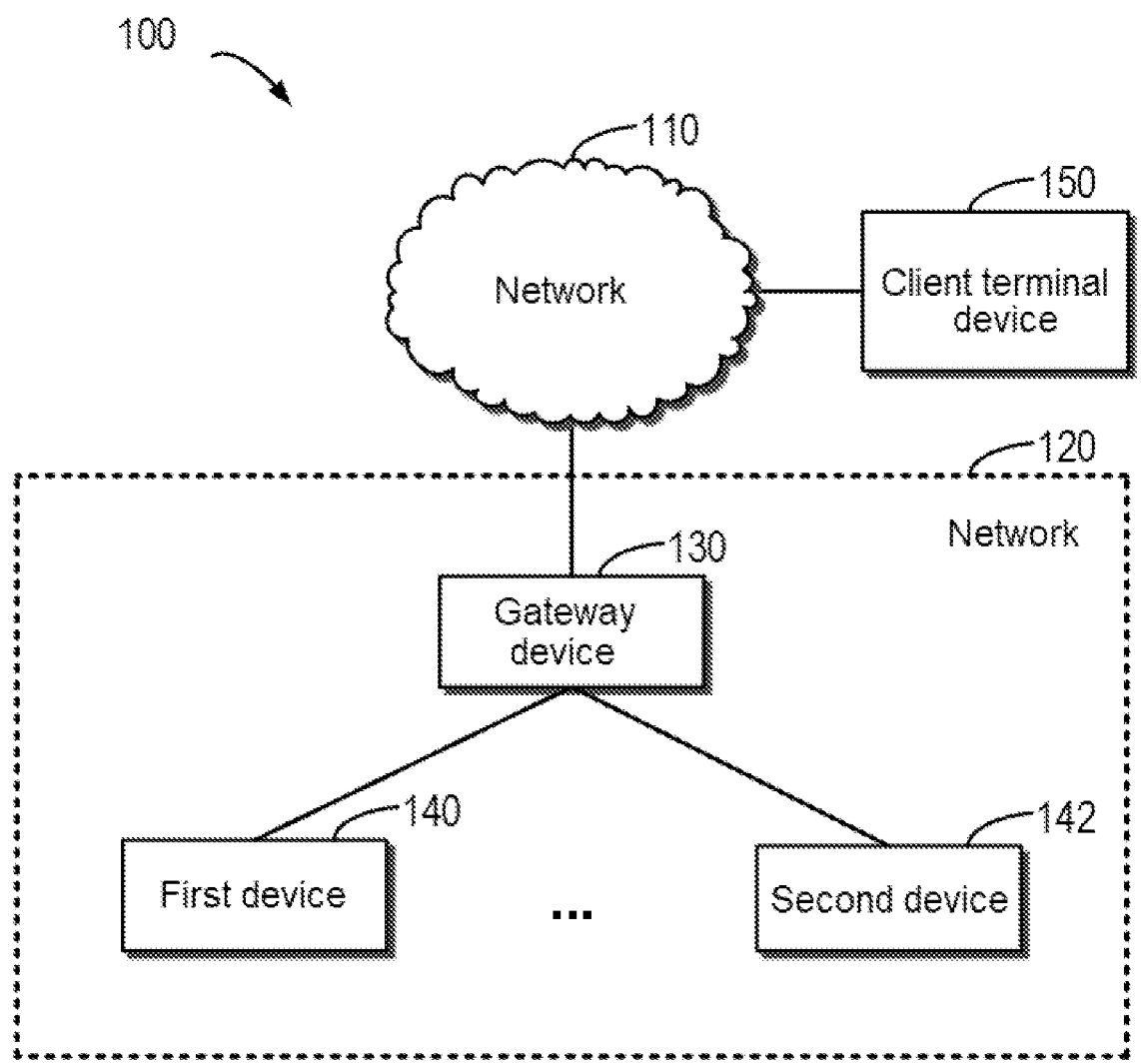
FIG. 1 schematically illustrates a block diagram of an application environment in which example implementations of the present disclosure may be implemented.

Firstly, an application environment according to an example implementation of the present disclosure will be described with reference to FIG. 1. FIG. 1 schematically illustrates a block diagram of application environment 100 in which example implementations of the present disclosure may be implemented. As shown in FIG. 1, multiple networks 110, 120, etc. may be included in application environment 100. Network 120 may include gateway device 130, such as a router and a switch, and first device 140, . . . , and second device 142 such as hosts or servers. Client terminal device 150 accesses data in first device 140 and second device 142 via network 110. It will be understood that although FIG. 1 schematically illustrates a situation where client terminal device 150 accesses via another network 110, client terminal device 150 may be located in network 120 according to an example implementation of the present disclosure. First device 140 and second device 142 may be incorrectly configured with the same IP address, which results in that a data access request may sometimes be routed to first device 140 and sometimes be routed to second device 142. At this point, client terminal device 150 cannot access the desired device.

A technical solution for assigning IP addresses to devices has been proposed. For example, before assigning an IP to first device 140, the IP address to be assigned may be broadcast in network 120. If second device 142 is using this IP address, second device 142 may send a reply to first device 140 to indicate that this IP address has been used. However, in this technical solution, only the IP address and MAC (Media Access Control) address of second device 142 can be obtained, and it is not known with which device first device 140 has an IP address conflict.

Figure 2:
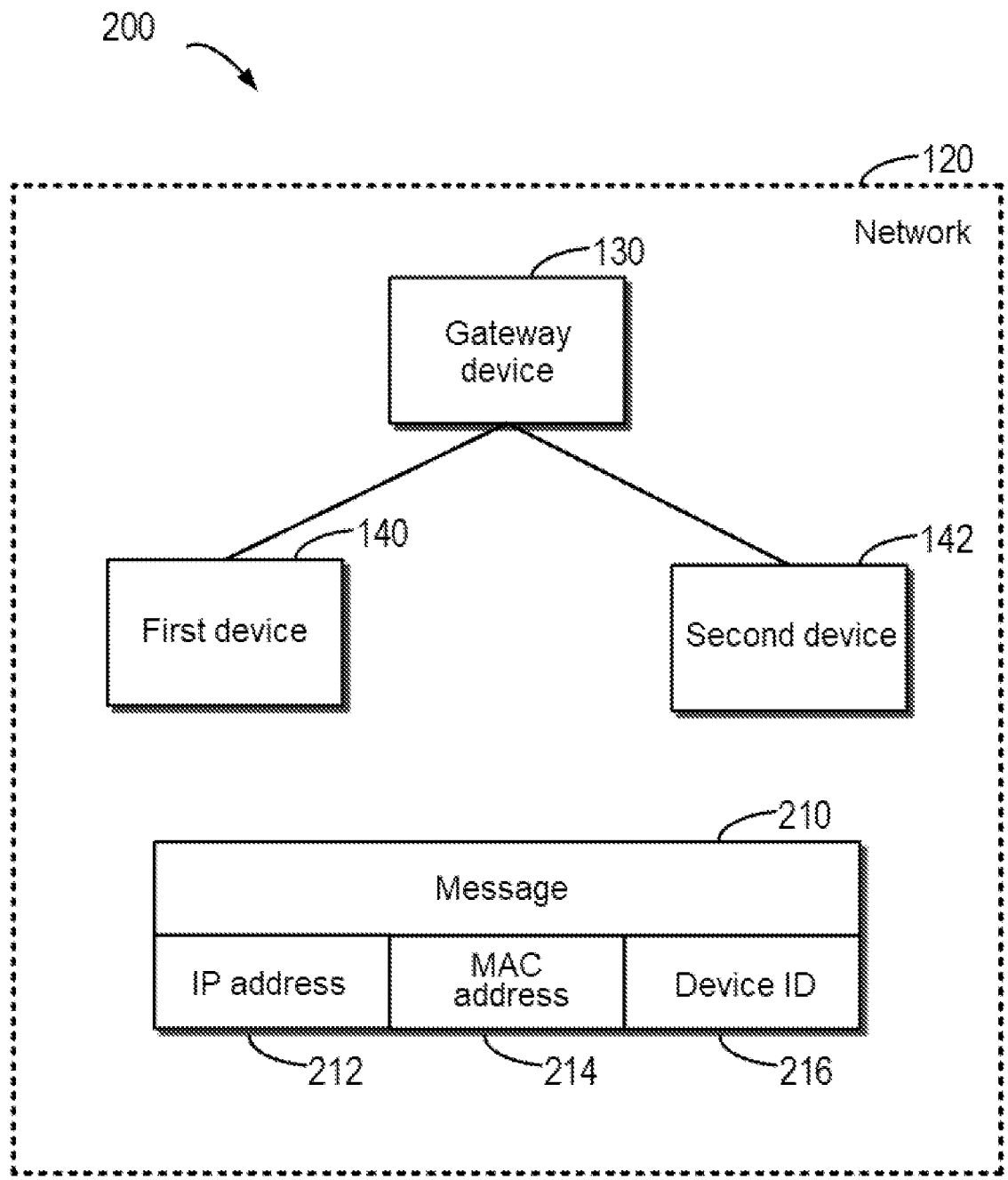
FIG. 2 schematically illustrates a block diagram of a process for managing addresses of devices in a network according to an example implementation of the present disclosure.

In order to overcome the above defect, an implementation of the present disclosure provides a technical solution for managing addresses of devices in a network. Hereinafter, an overview of the example implementations of the present disclosure will be first described with reference to FIG. 2. FIG. 2 schematically illustrates a block diagram of process 200 for managing addresses of devices in a network according to an example implementation of the present disclosure. As shown in FIG. 2, before assigning an IP address to first device 140, first device 140 may send message 210 to other devices in network 120 to ask whether the other devices use the IP address to be assigned. Here, message 210 may include IP address 212 of first device 140, MAC address 214 of first device 140, and device ID (e.g., a product serial number or other unique identifier) 216 of first device 140.

With the example implementation of the present disclosure, since message 210 includes the device ID, this allows other devices in network 120 to know the device ID of first device 140. Furthermore, in the situation where an IP address conflict occurs, it is possible to know which device is in conflict with their respective IP addresses. In this way, it can facilitate the detection of IP address conflicts in network 120 and thus reduce the risk of data inaccessibility errors.

Figure 3:
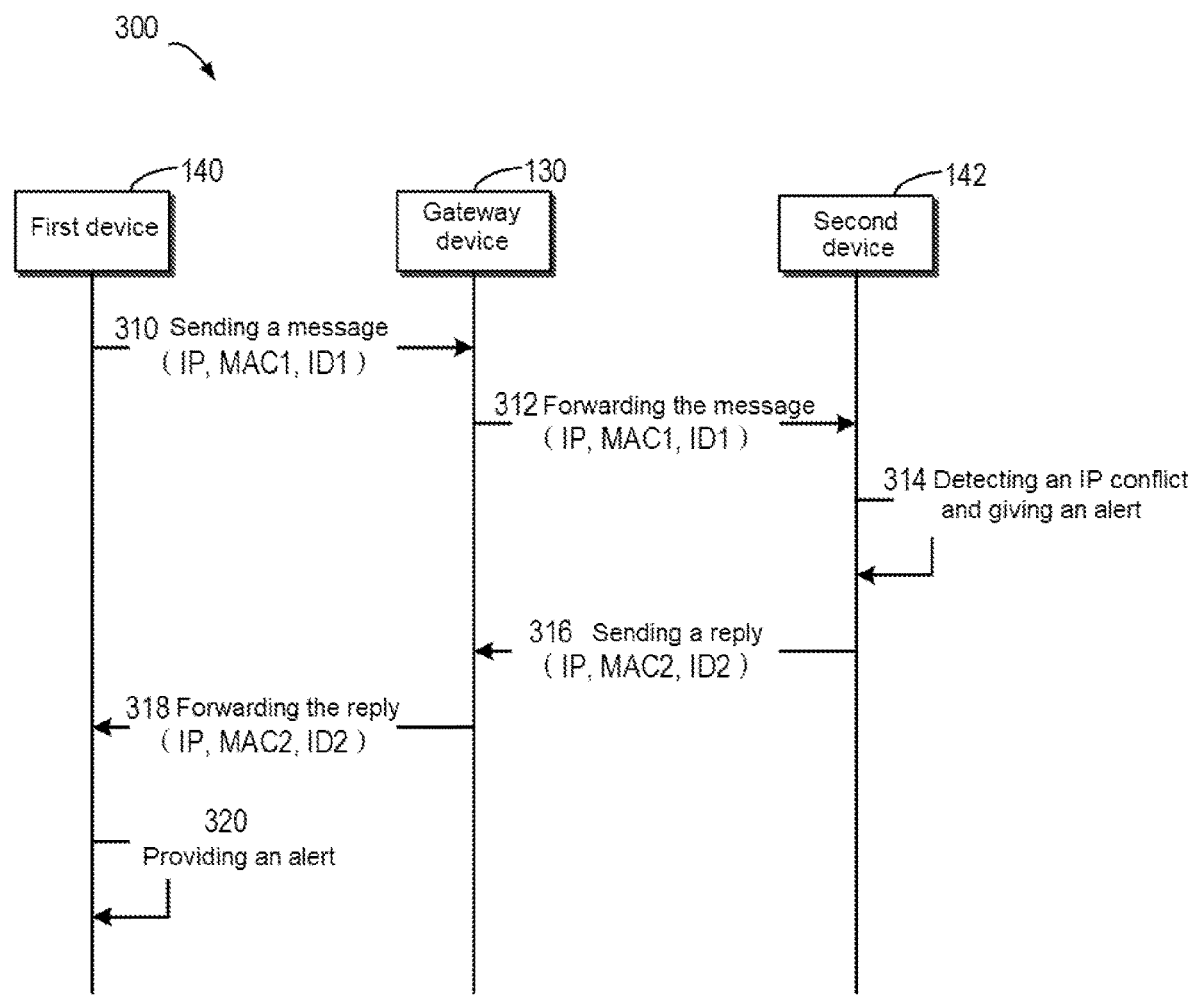
FIG. 3 schematically illustrates a block diagram of an interaction process between various devices in a network according to an example implementation of the present disclosure.

Hereinafter, more details of the example implementations according to the present disclosure will be described with reference to FIG. 3. FIG. 3 schematically illustrates a block diagram of interaction process 300 between various devices in a network according to an example implementation of the present disclosure. As shown in FIG. 3, before assigning an IP address to first device 140, first device 140 may send 310 a message to gateway device 130 (for example, the message may be sent in a broadcast manner), wherein the message may include an IP address (i.e., a designated IP), an MAC address (MAC1), and a device ID (ID1) of first device 140. Gateway device 130 may forward 312 the received message in the network.

Each device (e.g., second device 142) in the network can receive the message, and detect 314 whether the IP address in the received message has an IP address conflict with its own IP address. If second device 142 finds that the received IP address is the same as its own IP address, it determines that an IP address conflict occurs. Further, an alert may be provided at second device 142. At this point, second device 142 may send 316 a reply to gateway device 130 to indicate that an IP address conflict occurs. Specifically, the reply may include an IP address of second device 142, an MAC address (MAC2) of second device 142, and a device ID (ID2) of second device 142. Gateway device 130 may forward 318 the reply to first device 140 to notify first device 140 that an IP address conflict occurs. Then, an alert may be provided 320 at first device 140 to indicate that an IP address conflict occurs.

It will be understood that FIG. 3 only schematically illustrates a process of communication between first device 140 and one another device in a network. According to an example implementation of the present disclosure, first device 140 can communicate with all other devices in the network via gateway device 130. As shown in FIG. 3, messages transmitted between various devices may all include device IDs of senders, and may further include MAC addresses of the senders. Thus, when an IP address conflict occurs in the network, the two devices in conflict can determine which devices they are in conflict with via the device IDs in the received messages. In this way, firstly, an IP address conflict can be quickly detected; and secondly, the device IDs that caused the conflict can be known, and thus the sources of the conflict can be determined.

Figure 4:
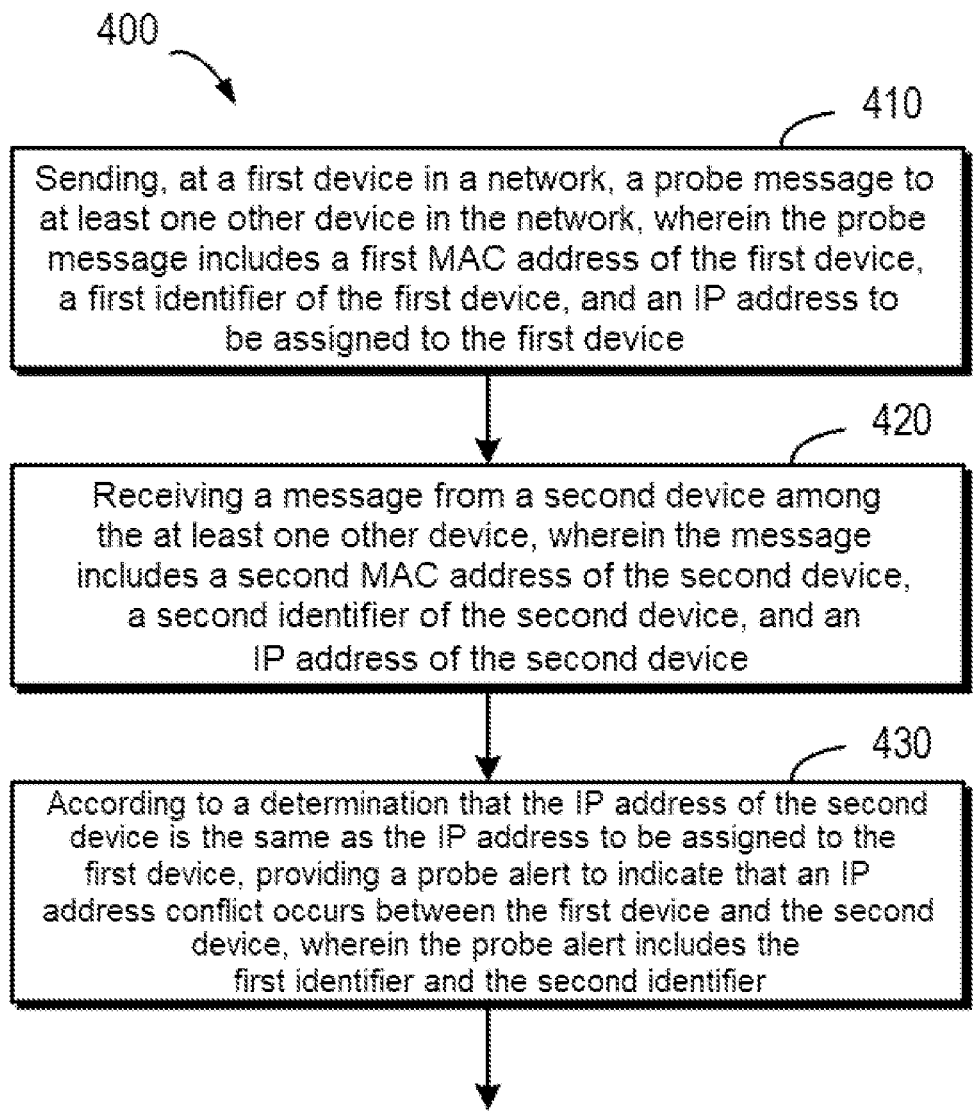
FIG. 4 schematically illustrates a flow chart of a method for managing addresses of devices in a network according to an example implementation of the present disclosure.

Hereinafter, more details of a method performed at first device 140 to which an IP address is to be assigned will be described with reference to FIG. 4. FIG. 4 schematically illustrates a flow chart of method 400 for managing addresses of devices in a network according to an example implementation of the present disclosure. Network 130 here includes first device 140 and at least one other device (for example, second device 142, etc.). At block 410, at first device 140, a probe message is sent to the at least one other device, wherein the probe message includes a first MAC address of first device 140, a first identifier of first device 140, and an IP address to be assigned to first device 140. In Ethernet, this probe message can be sent using a frame structure supported by Ethernet. Hereinafter, more details about a frame structure of Ethernet will be described with reference to FIG. 5.

Figure 5:
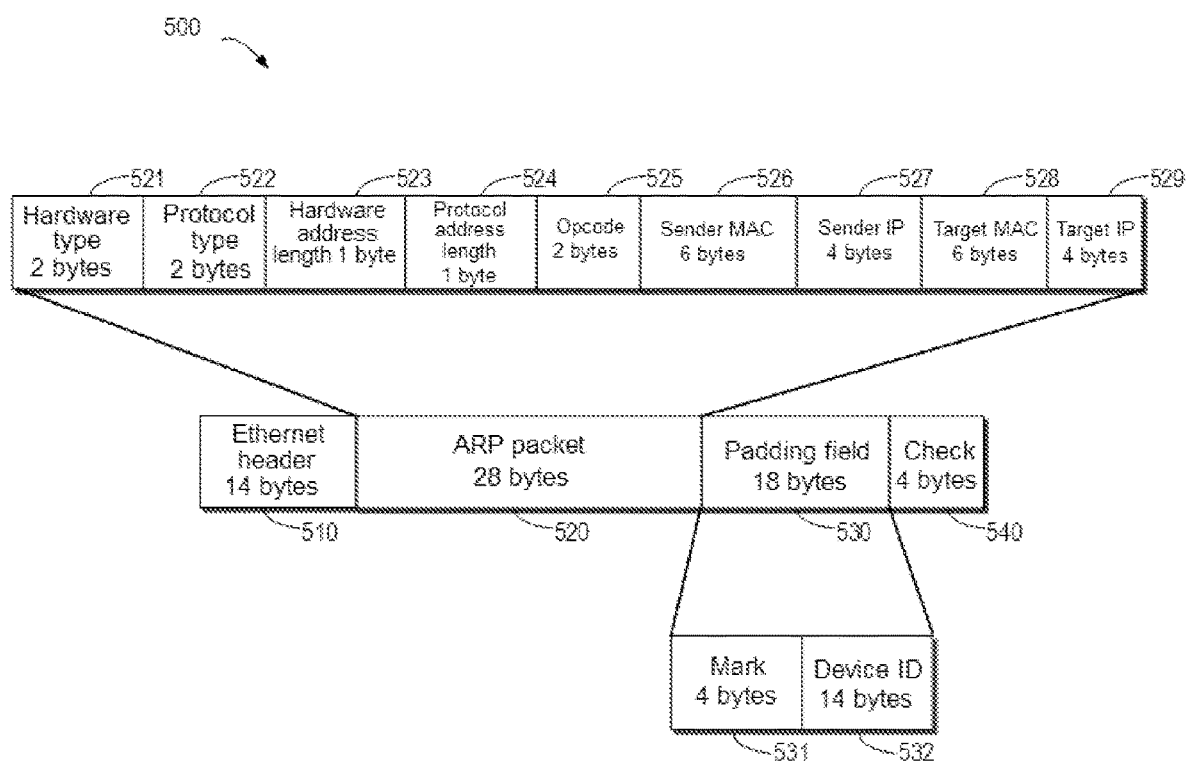
FIG. 5 schematically illustrates a block diagram of a frame structure of a message in a network according to an example implementation of the present disclosure.

FIG. 5 schematically illustrates a block diagram of frame structure 500 of a message in a network according to an example implementation of the present disclosure. As shown in FIG. 5, frame structure 500 may include several fields: an Ethernet header (14 bytes) which is used to indicate the beginning of an Ethernet frame; an ARP (Address Resolution Protocol) packet (28 bytes) which is used as a load part of the frame structure; a padding field (18 bytes) which is used as a padding part for later extension; and a check (4 bytes) which is used for checking purposes. According to an example implementation of the present disclosure, a first identifier can be written in the padding field of frame structure 500 supported by the network. In other words, the first identifier can be written in field 530.

According to an example implementation of the present disclosure, a predetermined mark can be written in padding field 530 to indicate that a device ID is written in padding field 530. A format of the padding field can be customized. As shown in FIG. 5, 4 bytes can be used to store mark 531, and 14 bytes can be used to store device ID 532. According to an example implementation of the present disclosure, a mark may be designated in advance to indicate that the current Ethernet data frame includes a device ID of a sender. For example, "dell" (or other character strings) may be used to indicate that padding field 530 is used to transmit the device ID. If "dell" is detected in padding field 530, it means that the data frame is a data frame created according to the example implementation of the present disclosure.

With the example implementation of the present disclosure, the predetermined mark supports the compatibility between the technical solution according to the example implementation of the present disclosure and the prior art solutions. If the predetermined mark is detected, the method according to the example implementation of the present disclosure is executed; and if the predetermined marker is not detected, the method of the prior art solution is performed. It will be understood that FIG. 5 only schematically illustrates a specific example of the format of padding field 530, and other formats may be used to define field 530 according to an example implementation of the present disclosure. For example, 2 bytes can be used to store the mark and 16 bytes to store the device ID.

According to an example implementation of the present disclosure, the first MAC address and the IP address to be assigned to first device 140 can be written in an existing field of the frame structure. Still refer to FIG. 5, the 28 bytes of the ARP packet may include the hardware type (521) of the sender, used protocol type 522, hardware address length 523, protocol address length 524, opcode 525, the MAC address of the sender, IP address 527 of the sender, MAC address 528 of a target, and IP address 529 of the target. Specifically, the first MAC address of first device 140 may be written in MAC address 526 of the sender, and the IP address to be assigned to first device 140 may be written in IP address 527 of the sender and IP address 529 of the target.

The structure regarding the transmission of messages in a network has already been described with reference to FIG. 5. Hereinafter, returning to FIG. 4, subsequent steps performed at first device 140 will be described. At block 420, a message from second device 142 among the at least one other device is received, wherein the message includes a second MAC address of second device 142, a second identifier of second device 142, and an IP address of second device 142. It will be understood that a message transmitted between first device 140 and second device 142 can be created in accordance with the frame structure shown in FIG. 5. At this point, the padding field of the message from second device 142 will include the second identifier of second device 142.

According to an example implementation of the present disclosure, it may be first determined whether the padding field of the message from second device 142 includes a predetermined mark. If the message includes the predetermined mark, the second identifier can be extracted from the padding field. If the message does not include the predetermined mark, it means that this message is a normal Ethernet message. In this way, Ethernet messages may be compatible between devices that support the example implementations according to the present disclosure and devices that do not support the example implementations according to the present disclosure.

Figure 6:
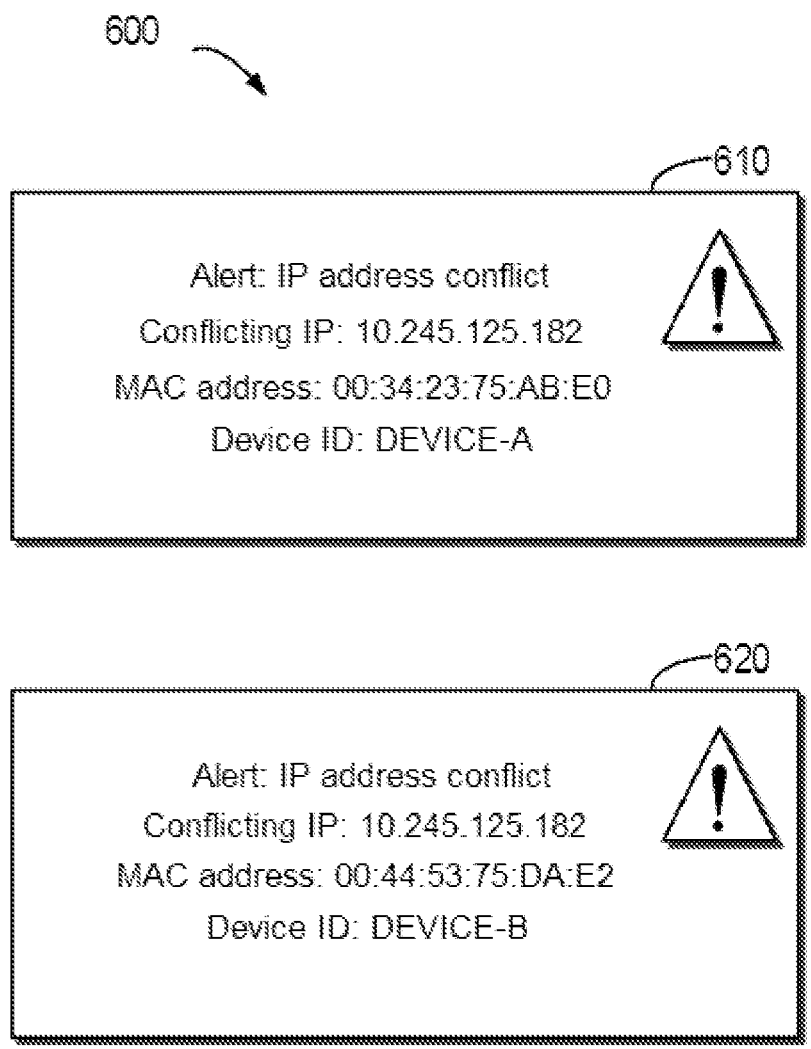
FIG. 6 schematically illustrates a block diagram of alerts provided to various devices according to an example implementation of the present disclosure.

At block 430, according to a determination that the IP address of second device 142 is the same as the IP address to be assigned to first device 140, a probe alert is provided to indicate that an IP address conflict occurs between first device 140 and second device 142, wherein the probe alert includes the first identifier and the second identifier. Alternatively and/or additionally, the probe alert may include the first identifier and the second identifier, the first MAC address of the first device, and the second MAC address of the second device. Hereinafter, more information about the alert will be described with reference to FIG. 6. FIG. 6 schematically illustrates block diagram 600 of alerts provided to devices according to an example implementation of the present disclosure. According to an example implementation of the present disclosure, alerts can be provided at two devices that have an IP address conflict.

As shown in FIG. 6, suppose that the IP address to be assigned to first device 140 is "10.245.125.182," the MAC address of first device 140 is "00:34:23:75:AB:E0," the device ID of first device 140 is "DEVICE-A," second device 142 is using the IP address "10.245.125.182," the MAC address of second device 142 is "00:44:53:75:DA:E2," and the device ID of second device 142 is "DEVICE-B." Alert 610 may be displayed at first device 140 and alert 620 may be displayed at second device 142. It will be understood that FIG. 6 only schematically illustrates an example of alerts, and that the alerts may be provided in other ways according to an example implementation of the present disclosure. For example, the alerts may respectively include related information (e.g., identifiers, IP addresses, and MAC addresses) about the two devices that have an IP address conflict.

Figure 7:
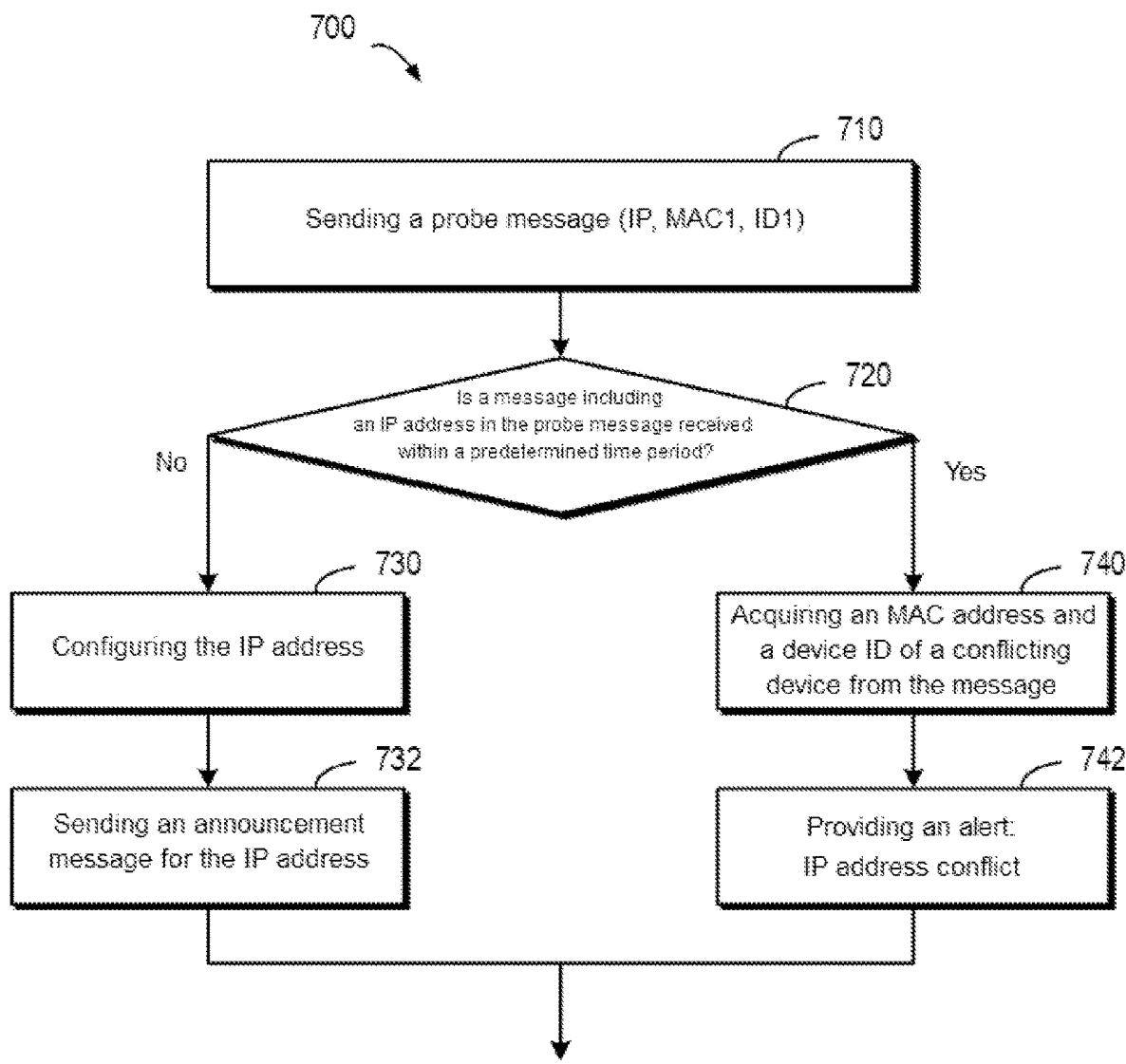
FIG. 7 schematically illustrates a flow chart of a method performed at a device performing IP address assignment according to an example implementation of the present disclosure.

According to an example implementation of the present disclosure, first device 140 can send a probe message and an announcement message. The probe message here indicates that first device 140 asks other devices in the network: Who is using the designated IP address? The announcement message indicates that first device 140 announces to other devices that: the designated IP address has been assigned to me. Hereinafter, more details of the method performed at first device 140 will be described with reference to FIG. 7. FIG. 7 schematically illustrates a flow chart of method 700 performed at a device performing IP address assignment according to an example implementation of the present disclosure.

At block 710, first device 140 sends a probe message. The probe message may include a designated IP address (i.e., IP) to be assigned to first device 140, an MAC address (i.e., MAC1), and a device ID (i.e., ID1). According to an example implementation of the present disclosure, if no address conflict is detected within a predetermined time period (e.g., 2 seconds or other time periods), the designated IP address may be assigned to first device 140. Specifically, at block 720, it may be determined whether a message including the designated IP address in the probe message is received from other devices within the predetermined time period. There are two possibilities for not detecting an IP address conflict: (1) no message is received from any other device among the at least one other device; and (2) IP addresses in all messages received from the at least one other device are different from the IP address to be assigned to first device 140. It is possible to determine whether an IP address conflict occurs based on the two possibilities mentioned above. If the result of determination at block 720 is "No," method 700 proceeds to block 730 to configure the IP address for first device 140.

Then, at block 732, first device 140 sends an announcement message to other devices to indicate that the designated IP address has been assigned to itself, and then the method ends. According to an example implementation of the present disclosure, the announcement message may include a first MAC address, a first identifier, and an IP address to be assigned to first device 140. In other words, the announcement message can announce to other devices in the network that: the designated IP address has been assigned to first device 140. According to an example implementation of the present disclosure, messages from other devices reporting conflicts may be delayed for reasons such as network delays or failures. At this point, first device 140 may provide an alert immediately after receiving a message reporting an IP address conflict.

According to an example implementation of the present disclosure, if it is determined that a reply message to the announcement message is received from a third device among the at least one other device, an announcement alert can be provided to indicate that an IP address conflict occurs between first device 140 and the third device. The reply message may include a third MAC address of the third device, a third identifier of the third device, and an IP address of the third device. It will be understood that the third device here may be any device in the network that is using the designated IP address, and that the announcement alert at this point may include the first identifier and the third identifier. The announcement alert may be displayed at first device 140 and at the third device, respectively, to indicate the occurrence of an IP address conflict. Alternatively and/or additionally, the announcement alert may include the first identifier and the third identifier, the first MAC address of the first device, and the third MAC address of the third device.

Return to block 720 of FIG. 7, if the result of determination at block 720 is "Yes," then method 700 proceeds to block 740. At this point, the received message including the designated IP address is from the conflicting device, and at block 740, an MAC address and a device ID of the conflicting device can be acquired from the received message. At block 742, an alert may be provided to indicate that an IP address conflict occurs. Specifically, the alert may include the designated IP address and the MAC address and device ID of the conflicting device.

According to an example implementation of the present disclosure, the message received by first device 140 may include a reply of other devices to the probe message. In other words, after finding that first device 140 is about to use the IP address that has been assigned to itself, another device may send a reply to first device 140 to indicate an IP address conflict. At this point, the IP address in the message received by first device 140 is an IP address that has been assigned to the conflicting device. With the example implementation of the present disclosure, it is possible to detect an error that first device 140 is about to use an IP address that has been assigned to some other device.

According to an example implementation of the present disclosure, the message received by first device 140 may include a probe message from other devices. In other words, another device is also sending a probe message and indicating that it wants to use the designated IP address. At this point, the IP address in the message received by first device 140 is an IP address to be assigned to a potentially conflicting device. With the example implementation of the present disclosure, it is possible to detect an error that first device 140 wishes to use the IP address to be assigned to some other device. After the alert has been provided, method 700 ends.

With the example implementation of the present disclosure, by extending the padding field of the message transmitted in the network, IDs of devices that may have an IP address conflict can be added to the message. In this way, not only an IP address conflict in the network can be detected, but also the device IDs in the message can be used to quickly find the relevant devices that are in conflict. Further, a network administrator can quickly take measures against various devices that cause conflicts, so as to reduce the risk of data inaccessibility in the network.

Figure 8:
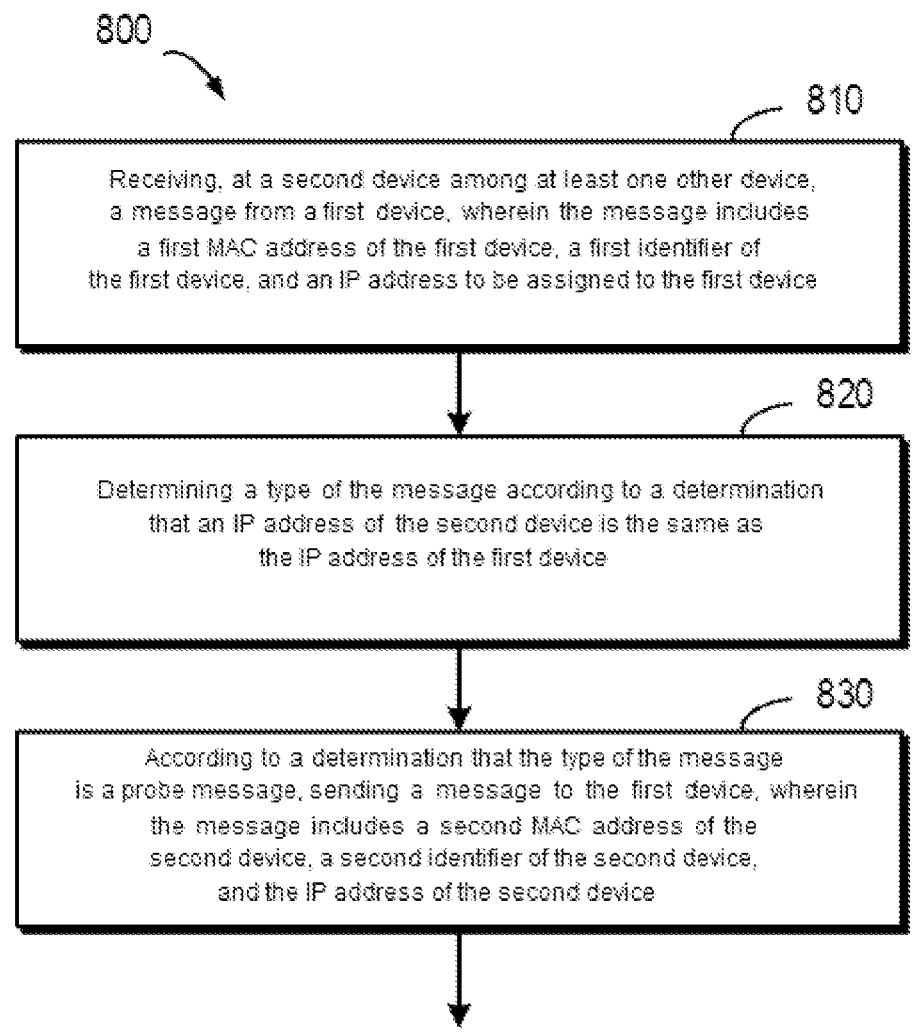
FIG. 8 schematically illustrates a flow chart of a method for managing addresses of devices in a network according to an example implementation of the present disclosure.

The process performed at first device 140 to which the designated IP address will be assigned has been described above, and hereinafter, the process performed at other devices in the network will be described with reference to FIG. 8. FIG. 8 schematically illustrates a flow chart of method 800 for managing addresses of devices in a network according to an example implementation of the present disclosure. For example, method 800 may be performed at second device 142. Specifically, at block 810, at second device 142 among the at least one other device, a message from first device 140 is received, wherein the message includes a first MAC address of first device 140, a first identifier of first device 140, and an IP address to be assigned to first device 140.

According to an example implementation of the present disclosure, it can be determined whether the received message supports the method according to the example implementations of the present disclosure according to whether a padding field of the message includes a predetermined mark. If it is determined that the padding field of the message includes a predetermined mark, the first identifier can be extracted from the padding field. If it is determined that the padding field of the message does not include a predetermined mark, it means that first device 140 has not enabled the method according to the example implementations of the present disclosure, but instead may process the received message according to the prior art solutions.

At block 820, a type of the message is determined according to a determination that an IP address of second device 142 is the same as the IP address of first device 140. It will be understood that the same IP address indicates that an IP address conflict may occur in the network, and thus different processes need to be performed according to the type of the message. Here, the type of the message may include a probe message and an announcement message. At block 830, according to a determination that the type of the message is a probe message, a message is sent to first device 140, wherein the message includes a second MAC address of second device 142, a second identifier of second device 142, and the IP address of second device 142.

According to an example implementation of the present disclosure, upon detection of a potential IP address conflict in the probe message, continued assignment of the designated IP address to first device 140 may be prevented by returning a message to first device 140. In this way, potential risks can be eliminated before the IP address that may cause a conflict is actually assigned to first device 140. Further, the second identifier of second device 142 carried in the returned message can help the administrator to quickly determine the potential conflicting device, and thus make it easy for the administrator to quickly take corresponding problem solving measures.

According to an example implementation of the present disclosure, when returning the message to first device 140, the second identifier may be written in a padding field of a frame structure supported by the network, and the second MAC address and the IP address of second device 142 may be written in an existing field of the frame structure. Specifically, the message may be sent from second device 142 to first device 140 based on the frame structure described in FIG. 5. According to an example implementation of the present disclosure, a predetermined mark may be written in the padding field to indicate that the second identifier is written to the padding field.

According to an example implementation of the present disclosure, the message received by second device 142 may be an announcement message. The announcement message is used to notify other devices in the network that: the designated IP address has been assigned to first device 140. If the IP address in the announcement message is found to be the IP address used by second device 142, then at second device 142, an alert may be provided to indicate that an IP address conflict occurs between first device 140 and second device 142. According to an example implementation of the present disclosure, the alert may include the first identifier and the second identifier. Specifically, alert 620 shown in FIG. 6 may be displayed at second device 142. Upon seeing the alert at second device 142, the user and/or network administrator of second device 142 can take corresponding measures. Alternatively and/or additionally, the alert may include the first identifier and the second identifier, the first MAC address of the first device, and the second MAC address of the second device.

According to an example implementation of the present disclosure, after receiving the announcement message from first device 140, second device 142 may send a reply message to the announcement message to first device 140 to notify first device 140 to stop using the IP address that has been assigned. Here, the reply message includes the second MAC address of second device 142, the second identifier of second device 142, and the IP address of second device 142.

Figure 9:
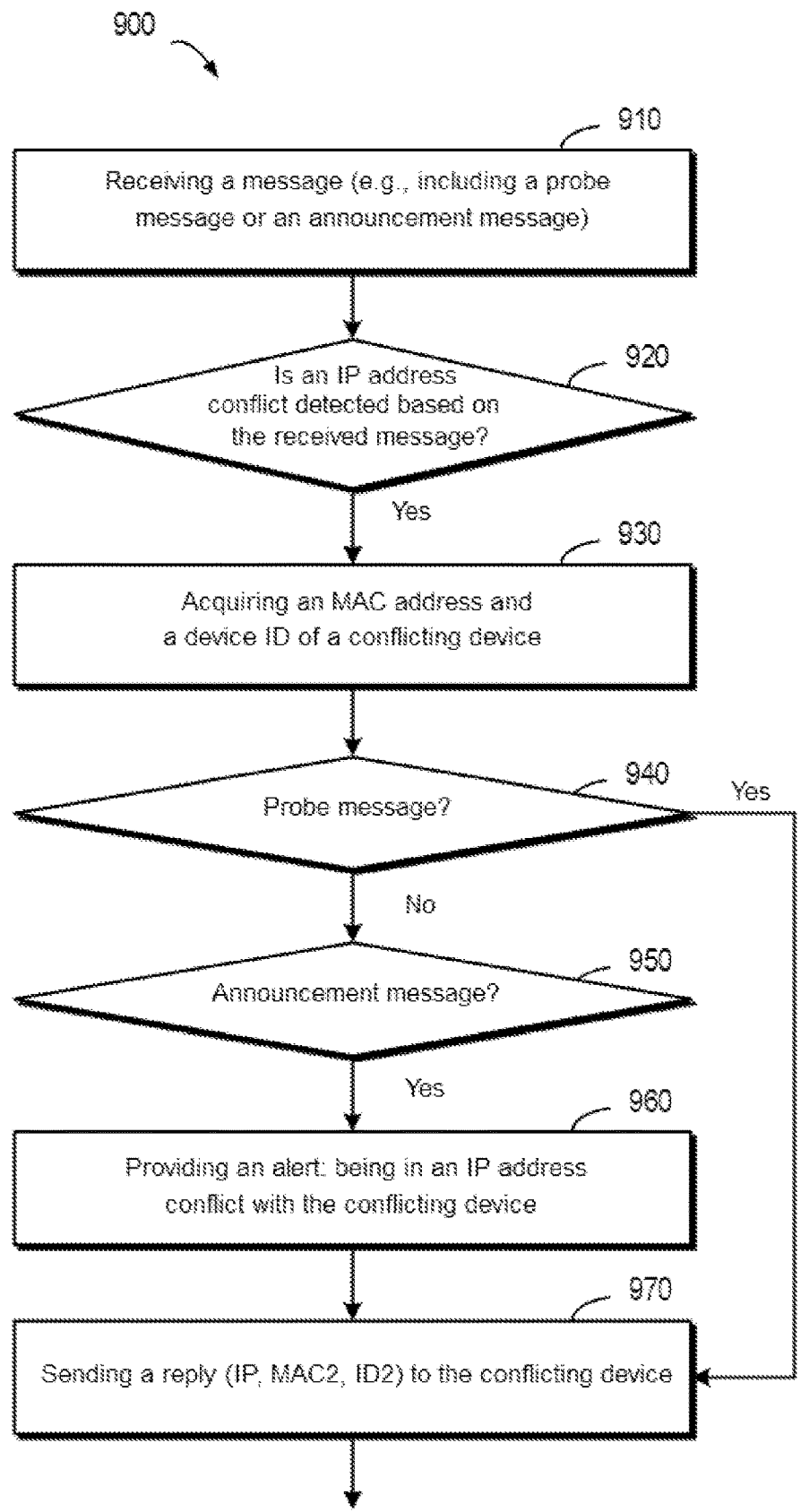
FIG. 9 schematically illustrates a flow chart of a method performed at another device according to an example implementation of the present disclosure.

Hereinafter, the method performed at other devices in the network than the device to which the designated IP address is to be assigned will be described in detail with reference to FIG. 9. FIG. 9 schematically illustrates a flow chart of method 900 performed at other devices according to an example implementation of the present disclosure. Specifically, method 900 may be executed at second device 142. At block 910, a message (e.g., including a probe message or an announcement message) from first device 140 may be received. At block 920, it may be determined whether an IP address conflict is detected using the received message. If no IP address conflict is detected, method 900 ends; and if an IP address conflict is detected, method 900 proceeds to block 930 to acquire the MAC address and device ID of the conflicting device (i.e., first device 140) from the received message.

At block 940, if it is determined that the received message is a probe message, method 900 proceeds to block 970 to send a reply to the conflicting device to indicate that the designated IP address has been used. Here, the reply may include the IP of second device 142, the MAC address (MAC2) of second device 142, and the device ID (ID2) of second device 142. At block 940, if it is determined that the received message is not a probe message, method 900 proceeds to block 950 to determine whether the message is an announcement message. If the result of determination at block 950 is "Yes," method 900 proceeds to block 960 to provide an alert at second device 142 to indicate that the IP address of first device 140 is the same as the IP address of second device 142, that is, an IP address conflict occurs. Then, method 900 proceeds to block 970 to send a reply to first device 140.

Examples of the method according to the present disclosure have been described in detail above with reference to FIGS. 2 to 9, and implementations of a corresponding apparatus will be described below. According to an example implementation of the present disclosure, an apparatus for managing addresses of devices in a network is provided. Here, the network includes a first device and at least one other device. The apparatus includes: a probe message sending module configured to send, at the first device, a probe message to the at least one other device, wherein the probe message includes a first MAC address of the first device, a first identifier of the first device, and an IP address to be assigned to the first device; a receiving module configured to receive a message from a second device among the at least one other device, wherein the message includes a second MAC address of the second device, a second identifier of the second device, and an IP address of the second device; and a providing module configured to provide, according to a determination that the IP address of the second device is the same as the IP address to be assigned to the first device, a probe alert to indicate that an IP address conflict occurs between the first device and the second device, wherein the probe alert includes the first identifier and the second identifier. According to an example implementation of the present disclosure, the apparatus further includes modules configured to execute other steps of methods 400 and 700 described above. According to an example implementation of the present disclosure, the apparatus can be implemented at first device 140. Alternatively and/or additionally, the probe alert may include the first identifier and the second identifier, the first MAC address of the first device, and the second MAC address of the second device.

According to an example implementation of the present disclosure, an apparatus for managing addresses of devices in a network is provided. Here, the network includes a first device and at least one other device. The apparatus includes: a receiving module configured to receive, at a second device among the at least one other device, a message from the first device, wherein the message includes a first MAC address of the first device, a first identifier of the first device, and an IP address to be assigned to the first device; a determining module configured to determine a type of the message according to a determination that an IP address of the second device is the same as the IP address of the first device; and a sending module configured to send a message to the first device according to a determination that the type of the message is a probe message, wherein the message includes a second MAC address of the second device, a second identifier of the second device, and the IP address of the second device. According to an example implementation of the present disclosure, the apparatus further includes modules configured to execute other steps of methods 800 and 900 described above. According to an example implementation of the present disclosure, the apparatus can be implemented at second device 142.

Figure 10:
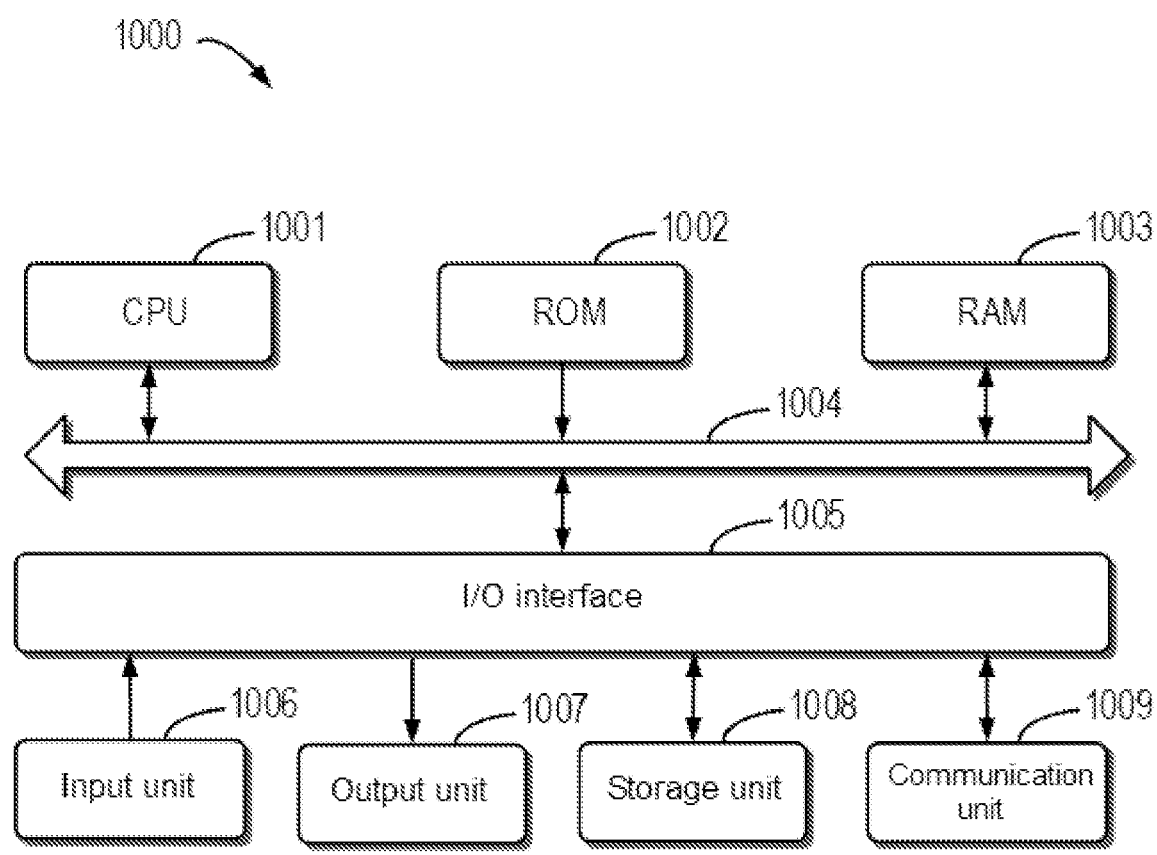
FIG. 10 schematically illustrates a block diagram of a device used for managing addresses of devices in a network and implemented according to an example implementation of the present disclosure.

FIG. 10 schematically illustrates a block diagram of device 1000 for managing artificial intelligence applications according to an example implementation of the present disclosure. As shown in the figure, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of storage device 1000 may also be stored. CPU 1001, ROM 1002, and RAM 1003 are connected to each other through bus 1004. Input/output (I/O) interface 1005 is also connected to bus 1004.

Multiple components in device 1000 are connected to I/O interface 1005, including: input unit 1006, such as a keyboard and a mouse; output unit 1007, such as various types of displays and speakers; storage unit 1008, such as a magnetic disk and an optical disk; and communication unit 1009, such as a network card, a modem, and a wireless communication transceiver. Communication unit 1009 allows device 1000 to exchange information/data with other devices over a computer network such as the Internet and/or various telecommunication networks.

The various processes and processing described above, for example, methods 400, 700, 800, and 900, can be performed by processing unit 1001. For example, in some implementations, methods 400, 700, 800, and 900 may be implemented as a computer software program that is tangibly contained in a machine-readable medium, such as storage unit 1008. In some implementations, part or all of the computer program may be loaded and/or installed onto device 1000 via ROM 1002 and/or communication unit 1009. When the computer program is loaded to RAM 1003 and executed by CPU 1001, one or more steps of methods 400, 700, 800, and 900 described above may be performed. Alternatively, in other implementations, CPU 1001 may also be configured in any other suitable manner to implement the above-mentioned processes/methods.

According to an example implementation of the present disclosure, an electronic device is provided, including: at least one processor; a volatile memory; and a memory coupled to the at least one processor, the memory having instructions stored therein, wherein the instructions, when executed by the at least one processor, cause the device to execute a method for managing addresses of devices in a network. Here, the network includes a first device and at least one other device, and the method includes: sending, at the first device, a probe message to the at least one other device, wherein the probe message includes a first MAC address of the first device, a first identifier of the first device, and an IP address to be assigned to the first device; receiving a message from a second device among the at least one other device, wherein the message includes a second MAC address of the second device, a second identifier of the second device, and an IP address of the second device; and providing, according to a determination that the IP address of the second device is the same as the IP address to be assigned to the first device, a probe alert to indicate that an IP address conflict occurs between the first device and the second device, wherein the probe alert includes the first identifier and the second identifier.

According to an example implementation of the present disclosure, sending the probe message includes: writing the first identifier in a padding field of a frame structure supported by the network; and writing, in an existing field of the frame structure, the first MAC address and the IP address to be assigned to the first device.

According to an example implementation of the present disclosure, writing the first identifier includes: writing a predetermined mark in the padding field to indicate that the first identifier is written to the padding field.

According to an example implementation of the present disclosure, the method further includes: according to a determination that a predetermined mark is included in a padding field of the message from the second device, extracting the second identifier from the padding field.

According to an example implementation of the present disclosure, the message includes a reply to the probe message, and the IP address of the second device in the message is an IP address that has been assigned to the second device.

According to an example implementation of the present disclosure, the message includes a probe message from the second device, and the IP address of the second device in the message is an IP address to be assigned to the second device.

According to an example implementation of the present disclosure, the method further includes: assigning the IP address to the first device according to a determination of at least any one of the following: that no message is received from any other device among the at least one other device; or that IP addresses in all messages received from the at least one other device are different from the IP address to be assigned to the first device.

According to an example implementation of the present disclosure, assigning the IP address to the first device includes: sending, at the first device, an announcement message to the at least one other device, wherein the announcement message includes the first MAC address, the first identifier, and the IP address to be assigned to the first device.

According to an example implementation of the present disclosure, the method further includes: according to a determination that a reply message to the announcement message is received from a third device among the at least one other device, providing an announcement alert to indicate that an IP address conflict occurs between the first device and the third device, wherein the reply message includes a third MAC address of the third device, a third identifier of the third device, and an IP address of the third device.

According to an example implementation of the present disclosure, the announcement alert includes the first identifier and the third identifier.

According to an example implementation of the present disclosure, the probe alert further includes the first MAC address of the first device and the second MAC address of the second device.

According to an example implementation of the present disclosure, the announcement alert further includes: the first MAC address of the first device and the third MAC address of the third device.

According to an example implementation of the present disclosure, an electronic device is provided, including: at least one processor; a volatile memory; and a memory coupled to the at least one processor, the memory having instructions stored therein, wherein the instructions, when executed by the at least one processor, cause the device to execute a method for managing addresses of devices in a network. Here, the network includes a first device and at least one other device, and the method includes: receiving, at a second device among the at least one other device, a message from the first device, wherein the message includes a first MAC address of the first device, a first identifier of the first device, and an IP address to be assigned to the first device; determining a type of the message according to a determination that an IP address of the second device is the same as the IP address of the first device; and according to a determination that the type of the message is a probe message, sending a message to the first device, wherein the message includes a second MAC address of the second device, a second identifier of the second device, and the IP address of the second device.

According to an example implementation of the present disclosure, sending the message to the first device includes: writing the second identifier in a padding field of a frame structure supported by the network; and writing, in an existing field of the frame structure, the second MAC address and the IP address of the second device.

According to an example implementation of the present disclosure, writing the second identifier includes: writing a predetermined mark in the padding field to indicate that the second identifier is written to the padding field.

According to an example implementation of the present disclosure, the method further includes: according to a determination that a predetermined mark is included in a padding field of the probe message, extracting the first identifier from the padding field.

According to an example implementation of the present disclosure, the method further includes: according to a determination that the type of the message is an announcement message, providing an alert to indicate that an IP address conflict occurs between the first device and the second device, wherein the alert includes the first identifier and the second identifier.

According to an example implementation of the present disclosure, the method further includes: sending a reply message to the announcement message to the first device, wherein the reply message includes the second MAC address of the second device, the second identifier of the second device, and the IP address of the second device.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example embodiment of the present disclosure, a computer-readable medium is provided. The computer-readable medium stores machine-executable instructions, which, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or a server. In the case involving a remote computer, the remote computer can be connected to a user's computer through any kind of network, including a local area network (LAN) or a wide area network (WAN), or it can be connected to an external computer (for example connected through an Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can all be implemented by computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing addresses of devices in a network that includes a first device and at least one other device, the method comprising:
    sending, at the first device, a probe message to the at least one other device, wherein the probe message includes a first MAC (Media Access Control Address) address of the first device, a first identifier of the first device, and an IP address to be assigned to the first device;
    receiving a message from a second device among the at least one other device, wherein the message includes a second MAC address of the second device, a second identifier of the second device, and an IP address of the second device;
    providing a probe alert to indicate that an IP address conflict occurs between the first device and the second device according to a determination that the IP address of the second device is the same as the IP address to be assigned to the first device, wherein the probe alert includes the first identifier and the second identifier; and
    according to a determination that a predetermined mark is included in a padding field of the message from the second device, extracting the second identifier from the padding field.

2. The method according to claim 1, wherein the message includes a reply to the probe message, and the IP address of the second device in the message is an IP address that has been assigned to the second device.

3. The method according to claim 1, wherein the message includes a probe message from the second device, and the IP address of the second device in the message is an IP address to be assigned to the second device.

4. The method according to claim 1, further including:
assigning the IP address to the first device according to a determination of at least any one of the following:
that no message is received from any other device among the at least one other device; or
that IP addresses in all messages received from the at least one other device are different from the IP address to be assigned to the first device.

5. The method according to claim 4, wherein assigning the IP address to the first device includes:
sending, at the first device, an announcement message to the at least one other device, wherein the announcement message includes the first MAC address, the first identifier, and the IP address assigned to the first device.

6. The method according to claim 5, further including:
according to a determination that a reply message to the announcement message is received from a third device among the at least one other device,
providing an announcement alert to indicate that an IP address conflict occurs between the first device and the third device, wherein the reply message includes a third MAC address of the third device, a third identifier of the third device, and an IP address of the third device, and the announcement alert includes the first identifier and the third identifier.

7. The method according to claim 6, wherein
the probe alert further includes the first MAC address of the first device and the second MAC address of the second device; and
the announcement alert further includes: the first MAC address of the first device and the third MAC address of the third device.

8. A method for managing addresses of devices in a network that includes a first device and at least one other device, the method comprising:
sending, at the first device, a probe message to the at least one other device, wherein the probe message includes a first MAC (Media Access Control Address) address of the first device, a first identifier of the first device, and an IP address to be assigned to the first device;
receiving a message from a second device among the at least one other device, wherein the message includes a second MAC address of the second device, a second identifier of the second device, and an IP address of the second device; and
providing a probe alert to indicate that an IP address conflict occurs between the first device and the second device according to a determination that the IP address of the second device is the same as the IP address to be assigned to the first device, wherein the probe alert includes the first identifier and the second identifier;
wherein sending the probe message includes:
writing the first identifier in a padding field of a frame structure supported by the network; and
writing, in an existing field of the frame structure, the first MAC address and the IP address to be assigned to the first device.

9. The method according to claim 8, wherein writing the first identifier includes: writing a predetermined mark in the padding field to indicate that the first identifier is written to the padding field.

10. The method according to claim 8, further including:
assigning the IP address to the first device according to a determination of at least any one of the following:
that no message is received from any other device among the at least one other device; or
that IP addresses in all messages received from the at least one other device are different from the IP address to be assigned to the first device; and
wherein assigning the IP address to the first device includes:
sending, at the first device, an announcement message to the at least one other device, wherein the announcement message includes the first MAC address, the first identifier, and
the IP address assigned to the first device.

11. The method according to claim 10, further including:
according to a determination that a reply message to the announcement message is received from a third device among the at least one other device,
providing an announcement alert to indicate that an IP address conflict occurs between the first device and the third device, wherein the reply message includes a third MAC address of the third device, a third identifier of the third device, and an IP address of the third device, and the announcement alert includes the first identifier and the third identifier.

12. A method for managing addresses of devices in a network that includes a first device and at least one other device, the method comprising:
receiving, at a second device among the at least one other device, a message from the first device, wherein the message includes a first MAC (Media Access Control Address) address of the first device, a first identifier of the first device, and an IP address to be assigned to the first device;
determining a type of the message according to a determination that an IP address of the second device is the same as the IP address of the first device;
according to a determination that the type of the message is a probe message, sending a message to the first device, wherein the message includes a second MAC address of the second device, a second identifier of the second device, and an IP address of the second device; and
according to a determination that a predetermined mark is included in a padding field of the probe message, extracting the first identifier from the padding field.

13. The method according to claim 12, further including:
providing an alert to indicate that an IP address conflict occurs between the first device and the second device according to a determination that the type of the message is an announcement message, wherein the alert includes the first identifier and the second identifier.

14. The method according to claim 13, further including:
sending a reply message to the announcement message to the first device, wherein the reply message includes the second MAC address of the second device, the second identifier of the second device, and the IP address of the second device.

15. A method for managing addresses of devices in a network that includes a first device and at least one other device, the method comprising:

receiving, at a second device among the at least one other device, a message from the first device, wherein the message includes a first MAC (Media Access Control Address) address of the first device, a first identifier of the first device, and an IP address to be assigned to the first device;

determining a type of the message according to a determination that an IP address of the second device is the same as the IP address of the first device; and according to a determination that the type of the message is a probe message, sending a message to the first device, wherein the message includes a second MAC address of the second device, a second identifier of the second device, and an IP address of the second device;

wherein sending the message to the first device includes:

writing the second identifier in a padding field of a frame structure supported by the network; and writing, in an existing field of the frame structure, the second MAC address and the IP address of the second device.

16. The method according to claim 15, wherein writing the second identifier includes: writing a predetermined mark in the padding field to indicate that the second identifier is written to the padding field.

17. An electronic device, including:

at least one processor;

a volatile memory; and a memory coupled to the at least one processor, the memory having instructions stored therein, wherein the instructions, when executed by the at least one processor, cause the device to perform a method of managing addresses of devices in a network that includes a first device and at least one other device, the method including:

sending, at the first device, a probe message to the at least one other device, wherein the probe message includes a first MAC (Media Access Control Address) address of the first device, a first identifier of the first device, and an IP address to be assigned to the first device;

receiving a message from a second device among the at least one other device, wherein the message includes a second MAC address of the second device, a second identifier of the second device, and an IP address of the second device;

providing a probe alert to indicate that an IP address conflict occurs between the first device and the second device according to a determination that the IP address of the second device is the same as the IP address to be assigned to the first device, wherein the probe alert includes the first identifier and the second identifier; and according to a determination that a predetermined mark is included in a padding field of the message from the second device, extracting the second identifier from the padding field.

18. An electronic device, including:

at least one processor;

a volatile memory; and a memory coupled to the at least one processor, the memory having instructions stored therein, wherein the instructions, when executed by the at least one processor, cause the device to manage addresses of devices in a network that includes a first device and at least one other device, the method including:

receiving, at a second device among the at least one other device, a message from the first device, wherein the message includes a first MAC address of the first device, a first identifier of the first device, and an IP address to be assigned to the first device;

determining a type of the message according to a determination that an IP address of the second device is the same as the IP address of the first device;

according to a determination that the type of the message is a probe message, sending a message to the first device, wherein the message includes a second MAC address of the second device, a second identifier of the second device, and an IP address of the second device; and according to a determination that a predetermined mark is included in a padding field of the probe message, extracting the first identifier from the padding field.

19. A computer program product having a non-transitory computer readable medium which stores a set of instructions to manage addresses of devices in a network that includes a first device and at least one other device; the set of instructions, when carried out by computerized circuitry, causing the computerized circuitry to perform a method of:

sending, at the first device, a probe message to the at least one other device, wherein the probe message includes a first MAC (Media Access Control Address) address of the first device, a first identifier of the first device, and an IP address to be assigned to the first device;

receiving a message from a second device among the at least one other device, wherein the message includes a second MAC address of the second device, a second identifier of the second device, and an IP address of the second device;

providing a probe alert to indicate that an IP address conflict occurs between the first device and the second device according to a determination that the IP address of the second device is the same as the IP address to be assigned to the first device, wherein the probe alert includes the first identifier and the second identifier; and according to a determination that a predetermined mark is included in a padding field of the message from the second device, extracting the second identifier from the padding field.

20. A computer program product having a non-transitory computer readable medium which stores a set of instructions to manage addresses of devices in a network that includes a first device and at least one other device; the set of instructions, when carried out by computerized circuitry, causing the computerized circuitry to perform a method of:

receiving, at a second device among the at least one other device, a message from the first device, wherein the message includes a first MAC address of the first device, a first identifier of the first device, and an IP address to be assigned to the first device;

determining a type of the message according to a determination that an IP address of the second device is the same as the IP address of the first device;

according to a determination that the type of the message is a probe message, sending a message to the first device, wherein the message includes a second MAC address of the second device, a second identifier of the second device, and an IP address of the second device; and according to a determination that a predetermined mark is included in a padding field of the probe message, extracting the first identifier from the padding field.

* * * * *